(12) United States Patent
Wang (10) Patent No.: US 8,820,942 B2
(45) Date of Patent: Sep. 2, 2014

(54) LIGHT DIVIDING STRUCTURE AND OPTICAL MACHINE SYSTEM COMPRISING THE SAME

(75) Inventor: Yuchang Wang, Taoyuan Hsien (TW)

(73) Assignee: Delta Electronics, Inc. (TW)

( * ) Notice: Subject to any disclaimer, the term of this patent is extended or adjusted under 35 U.S.C. 154(b) by 242 days.

(21) Appl. No.: 13/530,530

(22) Filed: Jun. 22, 2012

(65) Prior Publication Data

US 2013/0215391 A1 Aug. 22, 2013

(30) Foreign Application Priority Data

Feb. 17, 2012 (TW) .............................. 101105162 A (51) Int. Cl.
*G02B 5/04* (2006.01)
*F21V 33/00* (2006.01)
*G03B 21/28* (2006.01)
*G03B 21/26* (2006.01)

(52) U.S. Cl.
USPC ................ 353/94; 353/81; 362/234; 359/834

(58) Field of Classification Search
CPC .... G02B 5/045; G02B 27/126; G02B 27/143; H04N 9/3197; F21Y 2101/02; F21Y 2111/007
USPC ............ 353/81, 94, 33, 30, 31; 362/339, 234; 359/629, 633, 634, 831, 833, 834
See application file for complete search history.

(56) References Cited

U.S. PATENT DOCUMENTS

| | | | |
|---|---|---|---|
| 6,769,774 B2 | 8/2004 | McDowell | |
| 6,956,701 B1 * | 10/2005 | Peterson et al. | 359/618 |
| 7,382,538 B2 | 6/2008 | Fukunaga | |
| 7,486,450 B2 | 2/2009 | Kawakami et al. | |
| 7,591,559 B2 * | 9/2009 | Kurosaki | 353/94 |
| 7,926,951 B2 | 4/2011 | Bietry et al. | |
| 2007/0206155 A1 | 9/2007 | Lipton | |
| 2007/0229778 A1 | 10/2007 | Cha et al. | |
| 2010/0104260 A1 * | 4/2010 | Yoon et al. | 386/94 |
| 2010/0309296 A1 | 12/2010 | Harrold et al. | |

\* cited by examiner

*Primary Examiner* — William C Dowling
*Assistant Examiner* — Ryan Howard
(74) *Attorney, Agent, or Firm* — Lowe Hauptman & Ham, LLP (57) ABSTRACT

A light dividing structure used in an optical machine system of a projection apparatus is provided. The light dividing structure includes a first prism, a second prism, a third prism and a fourth prism. The first prism includes a first exiting surface, a first reflecting surface, a first concave portion and a second concave portion. The second prism is disposed on the second concave portion and is adjacent to the first prism. The third prism includes a second exiting surface, a second reflecting surface, a third concave portion and a fourth concave portion. The fourth prism is disposed on the fourth concave portion and is adjacent to the third prism and the first prism. The first prism, the second prism, the third prism and the fourth prism are connected together sequentially.

27 Claims, 7 Drawing Sheets

LIGHT DIVIDING STRUCTURE AND OPTICAL MACHINE SYSTEM COMPRISING THE SAME

This application claims priority to Taiwan Patent Application No. 101105162 filed on Feb. 17, 2012.

CROSS-REFERENCES TO RELATED APPLICATIONS

Not applicable.

BACKGROUND OF THE INVENTION

1. Field of the Invention

The present invention relates to a light dividing structure and an optical machine system comprising the same, and more particularly, to a light dividing structure and an optical machine system for generating multi-view stereoscopic images.

2. Descriptions of the Related Art

Nowadays, as modern people are in pursuit of more vivid visual experiences and finer image quality, the conventional two-dimensional (2D) displaying technologies have not been able to meet the demands for high-quality images. In contrast, three-dimensional (3D) displaying technologies not only provides finer image quality compared to conventional 2D displaying technologies, but also allows for more a more realistic 3D experience.

The 3D displaying technologies currently available are mainly divided into two categories: eyeglass displaying technologies and auto-stereoscopic displaying technologies.

As the name implies, "eyeglass displaying technologies" requires the wearing of special eyeglasses (e.g., anaglyph eyeglasses, polarization eyeglasses or shutter eyeglasses) in order for a user's left and right eyes to see the images of different viewing angles. In this way, a parallax is obtained to result in a stereoscopic impression.

The "auto-stereoscopic displaying technologies" may be further divided into two categories: "spatial multiplex" displaying technology and "time-multiplex" displaying technologies. "Spatial multiplex" displaying technologies project images of different viewing angles to different positions in the space so that the images of different viewing angles can be received by the left eye and the right eye of the user respectively and are then combined in the user's brain to form a stereoscopic image. However, as limited by the hardware components and the path loss of light, the resulting resolution of the image is often only a half of the original display. Therefore, the 3D image generated by the "spatial multiplex" displaying technology has a poor resolution. The "time multiplex" displaying technology works by increasing the displaying frequency of the display and using a backlight unit to control a traveling direction of light (i.e., the "directional backlight unit 3D film" method). According to the "time multiplex" displaying technology, the left-eye and the right-eye image signals are displayed alternately at different times, and backlight modules disposed on two sides are also turned on alternately. The two backlight modules are used for the left eye and the right eye respectively and are specially designed. Therefore, when different backlight modules are operating, the traveling direction of light will vary so that the left and the right frame will be projected to the left and the right eye of the user respectively. Because the "time multiplex" displaying technology projects images to be presented to the left and the right eyes alternately at different times, the images seen by both eyes have a full resolution. As a result, although the "time multiplex" displaying technology does not compromise the resolution of the images, it cannot display multi-view images simultaneously and, therefore, a 3D image can only be enjoyed in front of a screen. Consequently, once the screen is rotated by a certain angle, it will become impossible for the user to enjoy the 3D image.

Accordingly, it is important to provide a light dividing structure and an optical machine system capable of generating multi-view images so that a 3D image can be enjoyed by the user at different angles.

SUMMARY OF THE INVENTION

An objective of the present invention is to provide a light dividing structure and an optical machine system comprising the same. By using the light dividing structure and the optical machine system to generate multi-view stereoscopic images, the resolution of the images can be maintained and a plurality of fields of view can be additionally provided for the user to view the images.

To achieve the aforesaid objective, the present invention provides a light dividing structure for use in an optical machine system of a projection apparatus, which comprises a first prism, a second prism, a third prism and a fourth prism. The first prism has a first exiting surface, a first reflecting surface, a first concave portion and a second concave portion. The second prism is disposed on the second concave portion and is adjacent to the first prism. The third prism has a second exiting surface, a second reflecting surface, a third concave portion and a fourth concave portion. The third prism is adjacent to the second prism and disposed opposite the first prism. The fourth prism is disposed on the fourth concave portion and is adjacent to both the third prism and the first prism. The first prism is adjacent to the fourth prism near the first reflecting surface and the third prism is adjacent to the second prism near the second reflecting surface so that the first prism, the second prism, the third prism and the fourth prism are connected sequentially.

To achieve the aforesaid objective, the present invention provides an optical machine system for use in a projection apparatus, which further comprises a light-combining prism assembly, at least two reflecting lens assemblies and an imaging lens assembly in addition to the light dividing structure described above. The light-combining prism assembly comprises at least two prisms, at least two totally reflecting prisms and at least two digital micromirrors, and is disposed opposite the light dividing structure. The at least two reflecting lens assemblies are disposed at two opposite positions between the light dividing structure and the light-combining prism assembly. The at least two reflecting lens assemblies respectively reflect a first beam, a second beam, a third beam and a fourth beam emitted from the light dividing structure to the light-combining prism assembly. The light-combining prism assembly receives the first beam, the second beam, the third beam and the fourth beam and emits the beams to the imaging lens assembly.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 1:
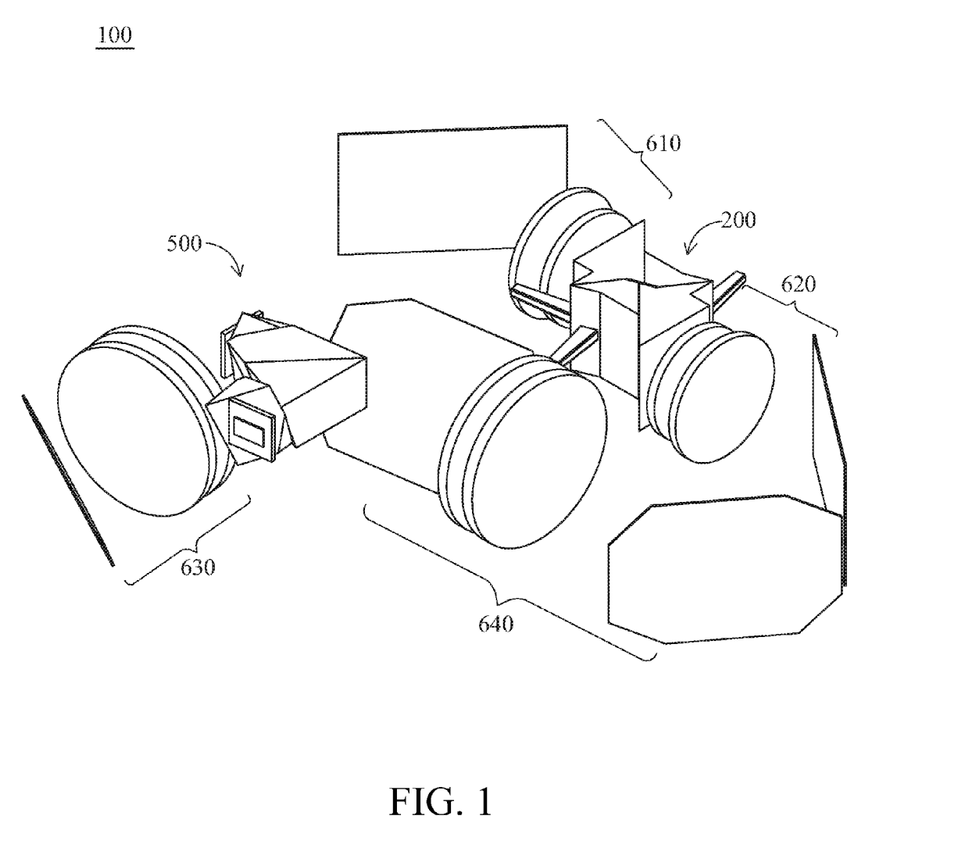
FIG. 1 is a schematic perspective view illustrating an optical machine system of the present invention.

As shown in FIG. 1, a light dividing structure 200 of the present invention is for use in an optical machine system 100 of a projection apparatus (not shown). Through a special design of the light dividing structure 200, four beams emitted inside the light dividing structure 200 can travel through a first reflecting lens assembly 610, a second reflecting lens assembly 620, a third reflecting lens assembly 630 and a fourth reflecting lens assembly 640 respectively and are then converged to a light-combining prism assembly 500 before being projected to form a multi-view stereoscopic image for a user to enjoy.

Figure 2:
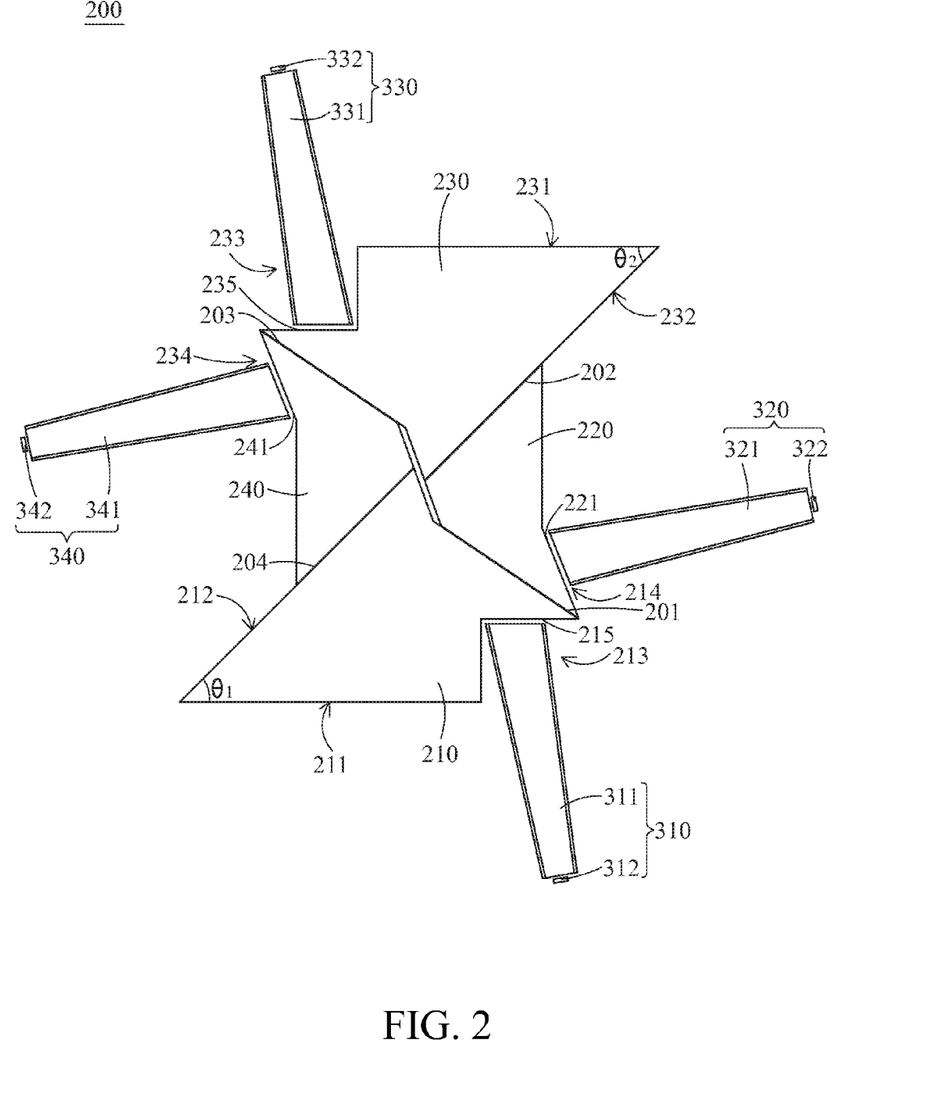
FIG. 2 is a schematic perspective view illustrating a light dividing structure of the present invention.

As shown in FIG. 2, in this embodiment, the light dividing structure 200 comprises a first prism 210, a second prism 220, a third prism 230 and a fourth prism 240. A first light-emitting device 310, a second light-emitting device 320, a third light-emitting device 330 and a fourth light-emitting device 340 are disposed corresponding to the four prisms respectively.

Figure 3A:
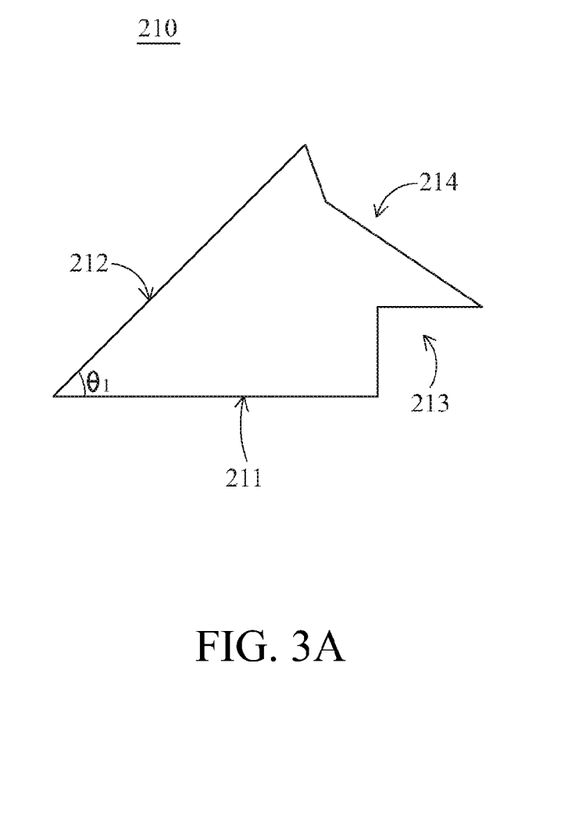
FIG. 3A is a schematic view illustrating a first prism of the light dividing structure of the present invention.

In reference to FIG. 3A, the first prism 210 has a first exiting surface 211, a first reflecting surface 212, a first concave portion 213 and a second concave portion 214. The first exiting surface 211 and the first reflecting surface 212 include a first angle $\theta_1$ therebetween. The first concave portion 213 is disposed on the first exiting surface 211 and away from the first angle $\theta_1$, while the second concave portion 214 is disposed on the first reflecting surface 212 and away from the first angle $\theta_1$. Meanwhile, the first angle $\theta_1$ is preferably an acute angle in this embodiment. Then, in reference to FIG. 2, the second prism 220 is adapted to be disposed on the second concave portion 214 of the first prism 210 and is adjacent to the first prism 210 with a first interval surface 201 formed between the first prism 210 and the second prism 220.

Figure 3B:
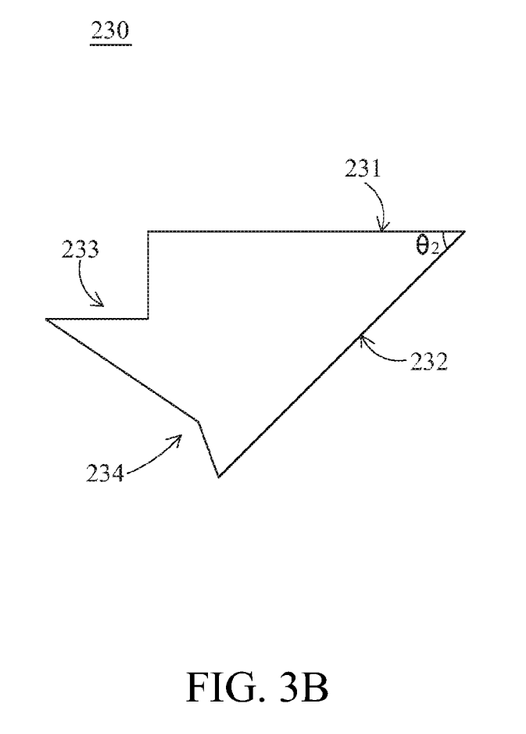
FIG. 3B is a schematic view illustrating a third prism of the light dividing structure of the present invention.

Similarly, as shown in FIG. 3B, the third prism 230 has a second exiting surface 231, a second reflecting surface 232, a third concave portion 233 and a fourth concave portion 234. The second exiting surface 231 and the second reflecting surface 232 include a second angle $\theta_2$ therebetween. The third concave portion 233 is disposed on the second exiting surface 231 and away from the second angle $\theta_2$, while the fourth concave portion 234 is disposed on the second reflecting surface 232 and away from the second angle $\theta_2$. The second angle $\theta_2$ is preferably an acute angle. Then, with reference to FIG. 2, the second reflecting surface 232 of the third prism 230 is adapted to be disposed adjacent to the second prism 220, and the fourth prism 240 is adapted to be disposed on the fourth concave portion 234 of the third prism 230 and is adjacent to the third prism 230 with a third interval surface 203 being formed between the third prism 230 and the fourth prism 240. Meanwhile, the fourth prism 240 is further adapted to be disposed adjacent to the first reflecting surface 212 of the first prism 210. Therefore, with this arrangement, the first prism 210, the second prism 220, the third prism 230 and the fourth prism 240 can be sequentially connected with each other to form the structure as shown in FIG. 2.

Figure 4A:
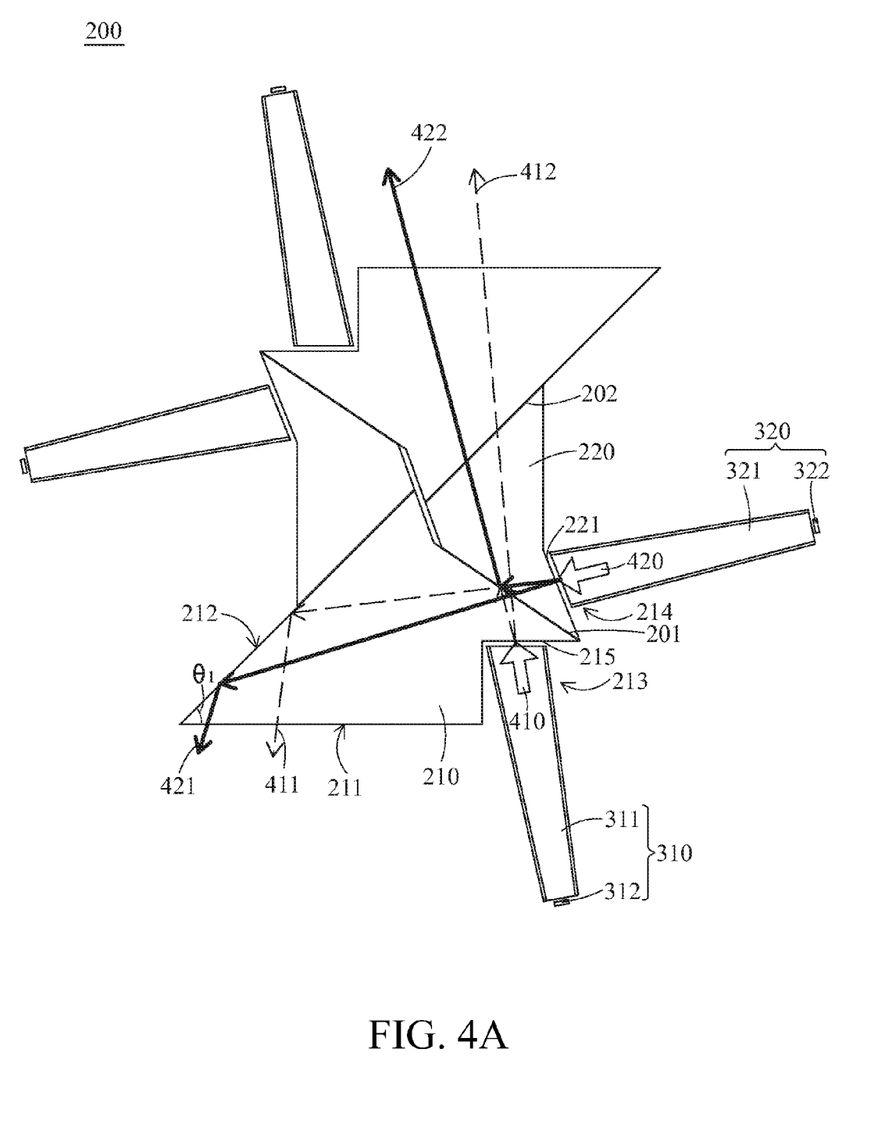
FIG. 4A is a schematic view illustrating optical paths of a first and a second beam in the light dividing structure according to the present invention.

As shown in FIG. 4A, the first prism 210 further has a first incident surface 215. The first incident surface 215 is disposed on the first concave portion 213. The first light-emitting device 310 is disposed on the first incident surface 215 to emit a first beam 410 to the first incident surface 215. Also, the second prism 220 further has a second incident surface 221. The second incident surface 221 is disposed on the other side of the second prism 220 that is opposite the first prism 210. The second light-emitting device 320 is disposed on the second incident surface 221 to emit a second beam 420 to the second incident surface 221.

Figure 4B:
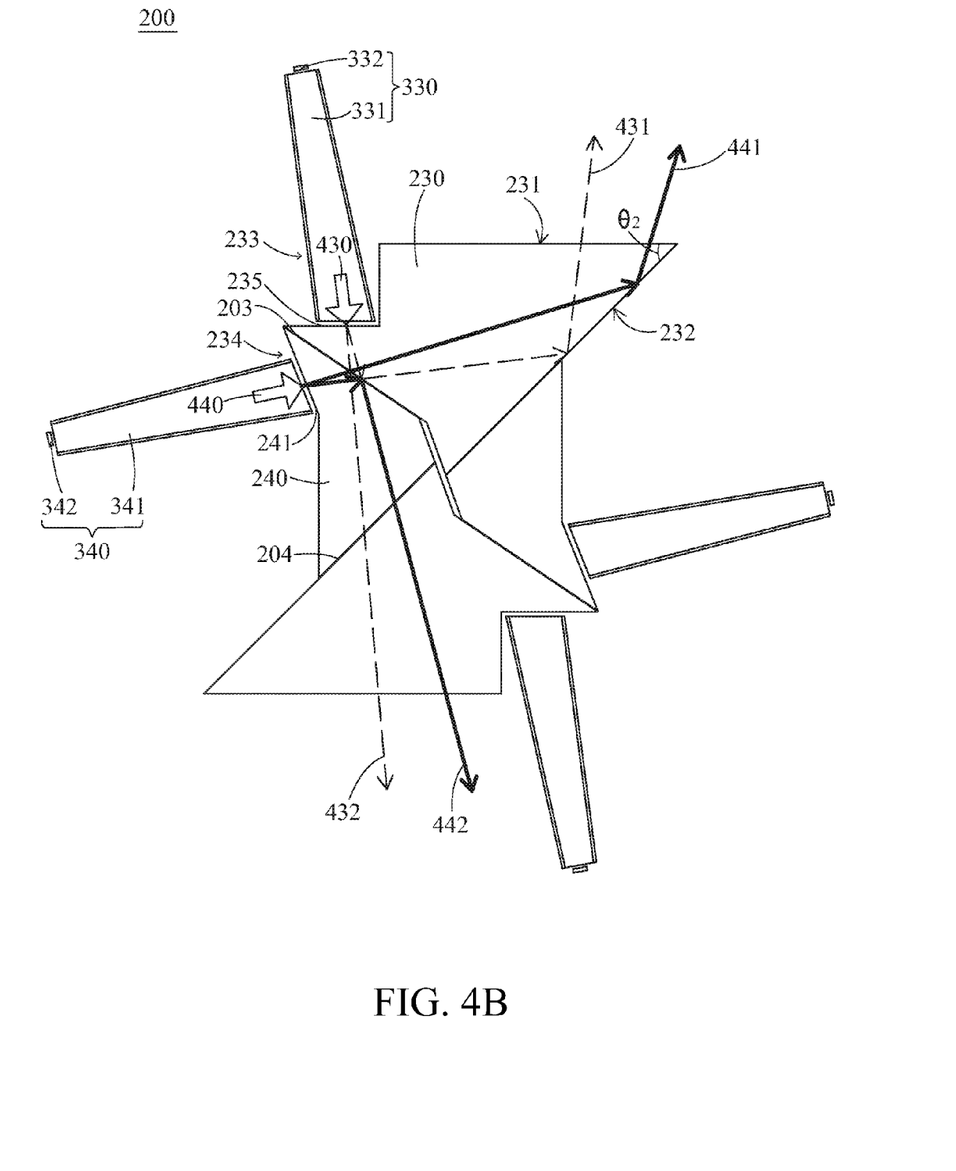
FIG. 4B is a schematic view illustrating optical paths of a third and a fourth beam in the light dividing structure according to the present invention.

As shown in FIG. 4B, the third prism 230 further has a third incident surface 235. The third incident surface 235 is disposed on the third concave portion 233, while the third light-emitting device 330 is disposed on the third incident surface 235 to emit a third beam 430 to the third incident surface 235. Also, the fourth prism 240 further has a fourth incident surface 241. The fourth incident surface 241 is disposed on the other side of the fourth prism 240 that is opposite the third prism 230, and the fourth light-emitting device 340 is disposed on the fourth incident surface 241 to emit a fourth beam 440 to the fourth incident surface 241.

The first light-emitting device 310 is adapted to be formed by a first light tunnel 311 and a first light source 312; the second light-emitting device 320 is adapted to be formed by a second light tunnel 321 and a second light source 322; the third light-emitting device 330 is adapted to be formed by a third light tunnel 331 and a third light source 332; and the fourth light-emitting device 340 is adapted to be formed by a fourth light tunnel 341 and a fourth light source 342. Furthermore, the first light source 312, the second light source 322, the third light source 332 and the fourth light source 342 are disposed on the sides of the first light tunnel 311, the second light tunnel 321, the third light tunnel 331 and the fourth light tunnel 341 that are opposite the first prism 210, the second prism 220, the third prism 230 and the fourth prism 240 respectively. The first light source 312, the second light source 322, the third light source 332 and the fourth light source 342 may each be formed by a single light emitting diode (LED) (white light) or a plurality of LEDs (light of the three primary colors, i.e., red light, blue light and green light), and the present invention has no limitation thereon.

It shall be particularly appreciated that in addition to the first interval surface 201 formed between the first prism 210 and the second prism 220 and the third interval surface 203 formed between the third prism 230 and the fourth prism 240, a second interval surface 202 is also formed between the second prism 220 and the third prism 230 and a fourth interval surface 204 is also formed between the fourth prism 240 and the first prism 210. In this embodiment, the first interval surface 201, the second interval surface 202, the third interval surface 203 and the fourth interval surface 204 are each preferably an air interval surface.

Hereinafter, optical paths of the first beam 410, the second beam 420, the third beam 430 and the fourth beam 440 in the light dividing structure 200 will be introduced respectively.

With reference to FIG. 4A, after being emitted from the first incident surface 215 to the first prism 210, the first beam 410 emitted by the first light-emitting device 310 is divided into a first portion 411 and a second portion 412. The first portion 411 of the first beam 410 is reflected by the first interval surface 201 to the first reflecting surface 212, and is then reflected by the first reflecting surface 212 to be projected out of the first prism 210 via the first exiting surface 211. The second portion 412 of the first beam 410 passes through the first interval surface 201 and the second interval surface 202 sequentially, and is then projected out of the third prism 230 via the second exiting surface 231.

After being emitted from the second incident surface 221 to the second prism 220, the second beam 420 emitted by the second light-emitting device 320 is divided into a first portion 421 and a second portion 422. As shown, the first portion 421 of the second beam 420 passes through the first interval surface 201 to the first reflecting surface 212, and is then reflected by the first reflecting surface 212 to be projected out of the first prism 210 via the first exiting surface 211. The second portion 422 of the second beam 420 is reflected by the first interval surface 201 to the second interval surface 202, and then passes through the second interval surface 202 to be projected out of the third prism 230 via the second exiting surface 231.

With reference to FIG. 4B, after being emitted from the third incident surface 235 to the third prism 230, the third beam 430 emitted by the third light-emitting device 330 is divided into a first portion 431 and a second portion 432. The first portion 431 of the third beam 430 is reflected by the third interval surface 203 to the second reflecting surface 232, and is then reflected by the second reflecting surface 232 to be projected out of the third prism 230 via the second exiting surface 231. The second portion 432 of the third beam 430 passes through the third interval surface 203 and the fourth interval surface 204 sequentially, and is projected out of the first prism 210 via the first exiting surface 211.

After being emitted from the fourth incident surface 241 to the fourth prism 240, the fourth beam 440 emitted by the fourth light-emitting device 340 is also divided into a first portion 441 and a second portion 442. The first portion 441 of the fourth beam 440 passes through the third interval surface 203 to the second reflecting surface 232, and is then reflected by the second reflecting surface 232 to be projected out of the third prism 230 via the second exiting surface 231. The second portion 442 of the fourth beam 440 is reflected by the third interval surface 203 to the fourth interval surface 204, and passes through the fourth interval surface 204 to be projected out of the first prism 210 via the first exiting surface 211.

Figure 5:
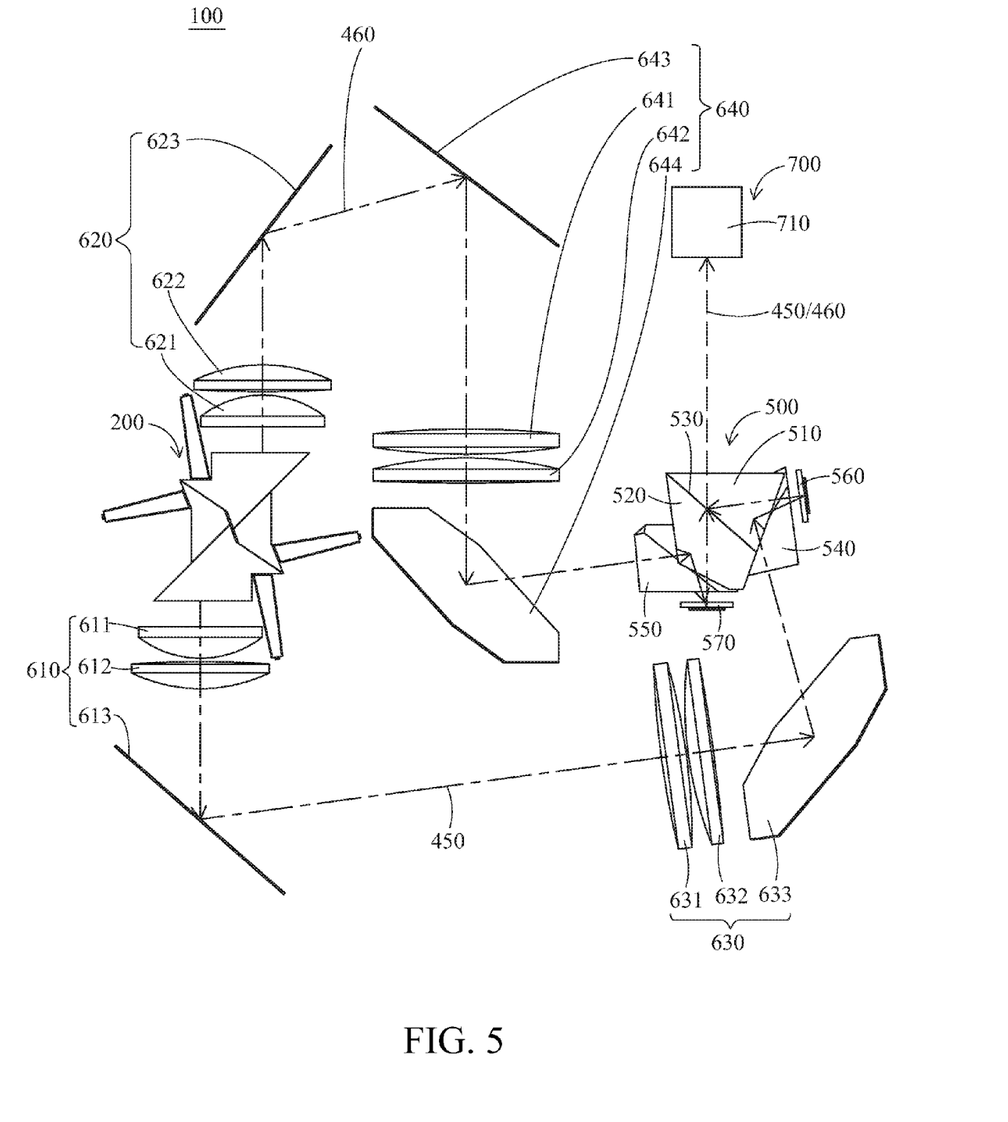
FIG. 5 is a schematic view illustrating the optical machine system of the present invention.

In reference to both FIGS. 1 and 5, in the preferred embodiment of the present invention, the optical machine system 100 further comprises the light-combining prism assembly 500, the first reflecting lens assembly 610, the second reflecting lens assembly 620, the third reflecting lens assembly 630, the fourth reflecting lens assembly 640 and an imaging lens assembly 700 in addition to the light dividing structure 200.

In detail, the light-combining prism assembly 500 is disposed opposite the light dividing structure 200, and comprises a fifth prism 510, a sixth prism 520, a first totally reflecting prism 540, a second totally reflecting prism 550, a first digital micromirror 560 and a second digital micromirror 570. The fifth prism 510 and the sixth prism 520 forms a bonding surface 530 therebetween. The first totally reflecting prism 540 is disposed adjacent to the fifth prism 510, while the second totally reflecting prism 550 is disposed adjacent to the sixth prism 520. The first digital micromirror 560 is disposed opposite the fifth prism 510 and at an outer side of the first totally reflecting prism 540. The second digital micromirror 570 is disposed opposite the sixth prism 520 and at an outer side of the second totally reflecting prism 550.

On the other hand, the first reflecting lens assembly 610 preferably has a first relay lens 611, a second relay lens 612 and a first reflecting mirror 613; the second reflecting lens assembly 620 has a third relay lens 621, a fourth relay lens 622 and a second reflecting mirror 623; the third reflecting lens assembly 630 has a fifth relay lens 631, a sixth relay lens 632 and a third reflecting mirror 633; and the fourth reflecting lens assembly 640 has a seventh relay lens 641, an eighth relay lens 642, a fourth reflecting mirror 643 and a fifth reflecting mirror 644.

After being emitted from the first exiting surface 211 of the first prism 210, the first portion 411 of the first beam 410, the first portion 421 of the second beam 420, the second portion 432 of the third beam 430 and the second portion 442 of the fourth beam 440 are defined as a fifth beam 450. The fifth beam 450 passes through the first relay lens 611 and the second relay lens 612 of the first reflecting lens assembly 610 sequentially and is reflected by the first reflecting mirror 613 to the third reflecting lens assembly 630. Then, the fifth beam 450 passes through the fifth relay lens 631 and the sixth relay lens 632 of the third reflecting lens assembly 630 sequentially, and is reflected by the third reflecting mirror 633 to the first totally reflecting prism 540 of the light-combining prism assembly 500. Then, the fifth beam 450 is totally reflected by the first totally reflecting prism 540 to the first digital micromirror 560. The first digital micromirror 560 then processes the fifth beam 450 properly and projects it into the fifth prism 510 so that the fifth beam 450 is reflected by the bonding surface 530 between the fifth prism 510 and the sixth prism 520.

Similarly, after being emitted from the second exiting surface 231 of the third prism 310, the second portion 412 of the first beam 410, the second portion 422 of the second beam 420, the first portion 431 of the third beam 430 and the first portion 441 of the fourth beam 440 are defined as a sixth beam 460. The sixth beam 460 passes through the third relay lens 621 and the fourth relay lens 622 of the second reflecting lens assembly 620 sequentially and is reflected by the second reflecting mirror 623 to the fourth reflecting lens assembly 640. Then, the sixth beam 460 is reflected by the fourth reflecting minor 643 of the fourth reflecting lens assembly 640, passes through the seventh relay lens 641 and the eighth relay lens 642 sequentially, and is reflected by the fifth reflecting mirror 644 to the second totally reflecting prism 550 of the light-combining prism assembly 500. Then, the sixth beam 460 is totally reflected by the second totally reflecting prism 550 to the second digital micromirror 570. The second digital micromirror 570 processes the sixth beam 460 properly and projects it to the sixth prism 520 so that the sixth beam 460 passes through the bonding surface 530 between the fifth prism 510 and the sixth prism 520.

Then, the fifth beam 450 and the sixth beam 460 are emitted from the light-combining prism assembly 500 to a camera lens 710 of the imaging lens assembly 700 and projected onto a screen (not shown). Finally, a beam formed by the fifth beam 450 and the sixth beam 460 in combination passes through a first microlens structure, a first cylindrical lens and a second cylindrical lens (none of which are shown) on the screen sequentially to form an eight-view stereoscopic image for the user to enjoy. Of course, the first microlens structure, the first cylindrical lens and the second cylindrical lens may also be arranged in other forms to form the beam, which is formed by the fifth beam 450 and the sixth beam 460 in combination, into a multi-view stereoscopic image, and the present invention has no limitation thereon. Furthermore, the first reflecting lens assembly 610, the second reflecting lens assembly 620, the third reflecting lens assembly 630, the fourth reflecting lens assembly 640 and the imaging lens assembly 700 may also have an increased or decreased number of lenses respectively depending on different needs, and the present invention also has no limitation thereon.

According to the above descriptions, with the light dividing structure and the optical machine system comprising the same disclosed in the present invention, a stereoscopic image with up to eight fields of view can be generated by using only four light sources without compromising the original resolution and image quality. Furthermore, the special optical arrangement of the light dividing structure of the present invention also facilitates a reduction in volume of the optical machine system, thereby achieving the purpose of reducing the occupied space.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A light dividing structure for use in an optical machine system of a projection apparatus, comprising:
   a first prism, having:
      a first exiting surface and a first reflecting surface that include a first angle therebetween;
      a first concave portion being disposed on the first exiting surface and away from the first angle;
      a second concave portion being disposed on the first reflecting surface and away from the first angle;
   a second prism being disposed on the second concave portion of the first prism and adjacent to the first prism;
   a third prism being adjacent to the second prism and disposed opposite the first prism, having:
      a second exiting surface and a second reflecting surface that include a second angle therebetween;
      a third concave portion being disposed on the second exiting surface and away from the second angle;
      a fourth concave portion being disposed on the second reflecting surface and away from the second angle; and
   a fourth prism being disposed on the fourth concave portion of the third prism and adjacent to both the third prism and the first prism;
   wherein the first prism is adjacent to the fourth prism by the first reflecting surface and the third prism is adjacent to the second prism by the second reflecting surface so that the first prism, the second prism, the third prism and the fourth prism are connected sequentially.

2. The light dividing structure as claimed in claim 1, wherein the first prism and the second prism respectively have a first incident surface and a second incident surface, the first incident surface is disposed on the first concave portion, and the second incident surface is opposite the first prism and disposed on the second prism.

3. The light dividing structure as claimed in claim 2, further comprising a first light-emitting device and a second light-emitting device which emit a first beam and a second beam respectively, the first light-emitting device is disposed on the first incident surface, and the second light-emitting device is disposed on the second incident surface.

4. The light dividing structure as claimed in claim 3, wherein the third prism and the fourth prism respectively have a third incident surface and a fourth incident surface, the third incident surface is disposed on the third concave portion, and the fourth incident surface is opposite the third prism and disposed on the fourth prism.

5. The light dividing structure as claimed in claim 4, further comprising a third light-emitting device and a fourth light-emitting device which emit a third beam and a fourth beam respectively, the third light-emitting device is disposed on the third incident surface, and the fourth light-emitting device is disposed on the fourth incident surface.

6. The light dividing structure as claimed in claim 5, further comprising a first interval surface, a second interval surface, a third interval surface and a fourth interval surface that are respectively formed between the first prism and the second prism, between the second prism and the third prism, between the third prism and the fourth prism, and between the fourth prism and the first prism.

7. The light dividing structure as claimed in claim 6, wherein the first beam is emitted from the first incident surface to the first prism, a first portion of the first beam is then reflected by the first interval surface and the first reflecting surface sequentially, and exits from the first exiting surface, and a second portion of the first beam passes through the first interval surface and the second interval surface sequentially, and then exits from the second exiting surface.

8. The light dividing structure as claimed in claim 7, wherein the second beam is emitted from the second incident surface to the second prism, a first portion of the second beam passes through the first interval surface, is reflected by the first reflecting surface and then exits from the first exiting surface, and a second portion of the second beam is reflected by the first interval surface, passes through the second interval surface, and then exits from the second exiting surface.

9. The light dividing structure as claimed in claim 8, wherein the third beam is emitted from the third incident surface to the third prism, a first portion of the third beam is reflected by the third interval surface and the second reflecting surface, and then exits from the second exiting surface, and a second portion of the third beam passes through the third interval surface and the fourth interval surface sequentially, and exits from the first exiting surface.

10. The light dividing structure as claimed in claim 9, wherein the fourth beam is emitted from the fourth incident surface to the fourth prism, a first portion of the fourth beam passes through the third interval surface and is reflected by the second reflecting surface, and then exits from the second exiting surface, and a second portion of the fourth beam is reflected by the third interval surface, passes through the fourth interval surface, and then exits from the first exiting surface.

11. The light dividing structure as claimed in claim 10, wherein the first interval surface, the second interval surface, the third interval surface and the fourth interval surface are all air interval surfaces.

12. The light dividing structure as claimed in claim 10, wherein the first light-emitting device, the second light-emitting device, the third light-emitting device, and the fourth light-emitting device respectively have a first light tunnel and a first light source, a second light tunnel and a second light source, a third light tunnel and a third light source, and a fourth light tunnel and a fourth light source.

13. The light dividing structure as claimed in claim 12, wherein the first light source, the second light source, the third light source, and the fourth light source are each comprised of a single LED or a plurality of LEDs.

14. The light dividing structure as claimed in claim 1, wherein both the first angle and the second angle are an acute angle.

15. An optical machine system for use in a projection apparatus, comprising:
the light dividing structure as claimed in claim 1;
a light-combining prism assembly disposed opposite the light dividing structure, comprising:
at least two prisms;
at least two totally reflecting prisms disposed adjacent to the at least two prisms respectively; and
at least two digital micromirrors disposed opposite the at least two prisms and at an outer side of the at least two totally reflecting prisms;
at least two reflecting lens assemblies disposed at two opposite positions between the light dividing structure and the light-combining prism assembly; and
an imaging lens assembly;
wherein the at least two reflecting lens assemblies respectively reflect a first beam, a second beam, a third beam and a fourth beam emitted from the light dividing structure to the light-combining prism assembly, and the light-combining prism assembly receives the first beam, the second beam, the third beam and the fourth beam and emits the beams to the imaging lens assembly.

16. The optical machine system as claimed in claim 15, wherein the at least two prisms are a fifth prism and a sixth prism, and the fifth prism and the sixth prism form a bonding surface therebetween.

17. The optical machine system as claimed in claim 16, wherein the at least two totally reflecting prisms are a first totally reflecting prism and a second totally reflecting prism, the first totally reflecting prism is adjacent to the fifth prism, and the second totally reflecting prism is adjacent to the sixth prism.

18. The optical machine system as claimed in claim 17, wherein the at least two digital micromirrors are a first digital micromirror and a second digital micromirror, the first digital micromirror is disposed opposite the fifth prism, and the second digital micromirror is disposed opposite the sixth prism.

19. The optical machine system as claimed in claim 18, wherein the at least two reflecting lens assemblies are a first reflecting lens assembly and a second reflecting lens assembly.

20. The optical machine system as claimed in claim 19, wherein the first reflecting lens assembly has a first relay lens, a second relay lens and a first reflecting mirror, and a first portion of the first beam, a first portion of the second beam, a second portion of the third beam and a second portion of the fourth beam emitted from the first exiting surface of the light dividing structure pass through the first relay lens and the second relay lens sequentially, and are then reflected by the first reflecting mirror to the light-combining prism assembly.

21. The optical machine system as claimed in claim 20, wherein the second reflecting lens assembly has a third relay lens, a fourth relay lens and a second reflecting mirror, and a second portion of the first beam, a second portion of the second beam, a first portion of the third beam and a first portion of the fourth beam emitted from the second exiting surface of the light dividing structure pass through the third relay lens and the fourth relay lens sequentially, and are then reflected from the second reflecting mirror to the light-combining prism assembly.

22. The optical machine system as claimed in claim 21, wherein the at least two reflecting lens assemblies further have a third reflecting lens assembly and a fourth reflecting lens assembly.

23. The optical machine system as claimed in claim 22, wherein the third reflecting lens assembly has a fifth relay lens, a sixth relay lens and a third reflecting mirror, and the first portion of the first beam, the first portion of the second beam, the second portion of the third beam and the second portion of the fourth beam form a fifth beam that passes through the fifth relay lens and the sixth relay lens sequentially and is then reflected from the third reflecting minor to the light-combining prism assembly.

24. The optical machine system as claimed in claim 23, wherein the fourth reflecting lens assembly has a seventh relay lens, an eighth relay lens, a fourth reflecting mirror and a fifth reflecting minor, and the second portion of the first beam, the second portion of the second beam, the first portion of the third beam and the first portion of the fourth beam form a sixth beam that passes through the fourth reflecting mirror, the seventh relay lens and the eighth relay lens and is then reflected from the fifth reflecting minor to the light-combining prism assembly.

25. The optical machine system as claimed in claim 24, wherein the first totally reflecting prism of the light-combining prism assembly receives the fifth beam, and then totally reflects the fifth beam from the first digital micromirror to the fifth prism and the bonding surface, and the fifth beam is then reflected to the imaging lens assembly by the bonding surface.

26. The optical machine system as claimed in claim 25, wherein the second totally reflecting prism of the light-combining prism assembly receives the sixth beam, and then totally reflects the sixth beam from the second digital micromirror to the sixth prism and through the bonding surface to the imaging lens assembly.

27. The optical machine system as claimed in claim 26, wherein the imaging lens assembly has a camera lens disposed opposite the light-combining prism assembly.

* * * * *